US011385471B1

(12) United States Patent
Zhou et al.

(10) Patent No.: US 11,385,471 B1
(45) Date of Patent: Jul. 12, 2022

(54) ACTIVE SELF-MONITORING BINOCULAR CALIBRATION TARGET

(71) Applicant: MLOptic Corp, Redmond, WA (US)

(72) Inventors: Wei Zhou, Sammamish, WA (US); Pengfei Wu, Nanjing (CN); Wei Wang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/683,309

(22) Filed: Feb. 28, 2022

(51) Int. Cl.
  *H04N 5/247* (2006.01)
  *G02B 27/62* (2006.01)
  *G06T 7/00* (2017.01)
  *G02B 27/10* (2006.01)

(52) U.S. Cl.
  CPC ......... *G02B 27/62* (2013.01); *G02B 27/1013* (2013.01); *G06T 7/0002* (2013.01); *H04N 5/247* (2013.01)

(58) Field of Classification Search
  CPC .. G02B 27/62; G02B 27/1013; G06T 7/0002; H04N 5/247
  USPC ....................................................... 348/135
  See application file for complete search history.

(56) References Cited

U.S. PATENT DOCUMENTS

2004/0095652 A1\* 5/2004 Kitabayashi ........... H04N 9/317
  359/636

\* cited by examiner

*Primary Examiner* — Nguyen T Truong
(74) *Attorney, Agent, or Firm* — Tracy Jong Law Firm; Tracy P. Jong; Cheng Ning Jong (57) ABSTRACT

A system for providing two spaced-apart parallel light beams wherein the space between the two spaced-apart parallel light beams is adjustable, the system including: a first beam splitter configured for reflecting a light beam from a light source to create a first light beam; a second beam splitter configured for reflecting a transmitted light beam from the light beam from the light source to create a second light beam; a third beam splitter configured for transmitting the first light beam and reflecting the first light beam to create a third light beam, the first beam splitter and the third beam splitter are disposed along a first central axis; a fourth beam splitter configured for transmitting the second light beam and reflecting the second light beam to create a fourth light beam.

8 Claims, 5 Drawing Sheets

ACTIVE SELF-MONITORING BINOCULAR CALIBRATION TARGET

BACKGROUND OF THE INVENTION

1. The Field of the Invention

The present invention relates to a calibration system for a pair of binoculars. More specifically, the present invention is directed to an active self-monitoring calibration system for a pair of binoculars.

2. Background Art

Product performance testing of a pair of binoculars, e.g., Augmented Reality/Virtual Reality (AR/VR) glasses requires the use of perfectly parallelly-disposed light beams received at the exit pupils of the glasses to simulate a pair of human eyes. A deviation or defect of any one of the light paths through the exit pupils of the glasses is sufficient to cause severe discomfort to a user of the glasses. The genesis of a deviation of a light path through an exit pupils of AR/VR glasses can be imperfections introduced during fabrication, shipping and/or use of the AR/VR glasses. During a quality control process, a calibration system may be used in conjunction with the glasses to calibrate the glasses by indicating a deviation and adjusting one or more light paths of the glasses to eliminate the deviation. However, for the calibration system to be effective, the calibration system itself is required to be precise and free from any defects even when the interpupillary distance (IPD) of the calibration system is adjustable in the range of about 60 mm-220 mm. One such requirement is for the light beams useful for indicating whether the light paths through the exit pupils of the glasses are disposed in parallel. Like the glasses themselves, the calibration system useful for the calibrating the glasses is equally likely to be subject to imperfections introduced during fabrication, shipping and/or use of the calibration system. The interpupillary distance (IPD) of a general adult is between about 60 mm and 75 mm and the image projection module of the glasses is arranged at the outer end close to the human ear and the distance between exit pupils is between about 110-135 mm. In some instances, the IPD of the calibration system needs to cover a width of about 60 mm-135 mm. In the AR/VR virtual reality display equipment performance detection process, a target source or calibration system with a large IPD and a wide object distance range is required. A collimator suitable for providing large-aperture beams and wide object distances is large and costly and requires a large space to accommodate it, i.e., a space unavailable in a compact calibration system. The distance between the exit pupils of a suitable calibration system needs to be about 60 mm-200 mm.

There exists a need for a system for providing a calibration system having two light beams and the IPD of the two light beams must be capable of adjustment such that the distance between the two light beams is adjustable to coincide with the IPD of the glasses at exit pupils. Further, at least one of the mechanisms must be capable of adjustment such that the two light beams can be disposed in a perfectly parallel configuration.

SUMMARY OF THE INVENTION

In accordance with the present invention, there is provided a system for providing two spaced-apart parallel light beams wherein the space between the two spaced-apart parallel light beams is adjustable, the system including:

(a) a first beam splitter configured for reflecting a light beam from a light source to create a first light beam;

(b) a second beam splitter configured for reflecting a transmitted light beam from the light beam from the light source to create a second light beam;

(c) a third beam splitter configured for transmitting the first light beam and reflecting the first light beam to create a third light beam, the first beam splitter and the third beam splitter are disposed along a first central axis;

(d) a fourth beam splitter configured for transmitting the second light beam and reflecting the second light beam to create a fourth light beam, wherein the third light beam and the fourth light beam together form a first image; and (e) a structure including a second central axis, each of the second beam splitter and the fourth beam splitter is disposed on the structure along the second central axis of the structure, the structure is configured to be movable with respect to the first light beam and the third light beam such that a perpendicular distance between the second central axis of the structure and the first central axis is adjustable;

wherein if the first image is determined to be an image including a fringe pattern, a request for correcting at least one of a rotation and a translation of at least one of the second beam splitter and the fourth beam splitter is indicated.

In one embodiment, the distance is about 60-220 mm. In one embodiment, the system further includes a first camera configured for receiving the first image and a control device to which the first camera is functionally connected and the determination is made using the controller. In one embodiment, if the first image is determined to be a uniform pattern, the first light beam is determined to be parallel to the second light beam. In one embodiment, the system further includes a second camera configured for receiving a second image resulting from directing the first light beam and the second light beam through exit pupils of a pair of binoculars to an entrance pupil of the pair of binoculars and a control device to which the second camera is functionally connected and if the second image is determined to be of non-coincidental cast images through the exit pupils of the pair of binoculars by the first light beam and the second light beam, a light path through a first of the exit pupils of the pair of binoculars is determined to be not parallel to a light path through a second of the exit pupils of the pair of binoculars. In one embodiment, the cast images are cast images of reticles. In one embodiment, the rotation correction is performed with a rotation mechanism. In one embodiment, the translation correction is performed with a translation mechanism.

An object of the present invention is to provide a calibration target for exit pupils disposed at a large interpupillary distance (IPD).

Another object of the present invention is to provide an adjustable calibration target for exit pupils of glasses or binoculars disposed at various large IPDs.

Another object of the present invention is to provide a self-monitoring calibration target for exit pupils disposed at a large IPD.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—self-monitoring binocular calibration system
4—light source
6—beam splitter
8—light beam
10—structure
12—base
14—movement
16—translation mechanism
18—reflected light beam
20—transmitted light beam
22—camera
24—distance between light beams
26—collimator
28—reticle
30—display or image plane
32—cast image
34—cast image
36—camera
38—binoculars or binocular telescope
40—reticle
42—control device
44—adjustment mechanism, e.g., translation adjustment mechanism, rotation adjustment mechanism, etc.
46—exit pupil of binocular
48—fringe pattern
50—rotation mechanism
52—drive gear
54—driven gear
56—central axis of structure
58—central axis
60—beam splitter orientation prior to correction
62—beam splitter orientation after correction
64—interpupillary distance (IPD)
66—deviation
68—lens
70—uniform pattern Particular Advantages of the Invention In one embodiment, the present system self-monitors to ensure that parallel light beams are produced and supplied at exit pupils to a pair of binoculars such that the calibration of light paths of the pair of binoculars through the exit pupils of a pair of binoculars can be carried out.

In one embodiment, the present system produces a pair of light beams disposed at an adjustable distance suitable for use to coincide with exit pupils of a pair of binoculars spaced-apart an interpupillary distance (IPD).

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
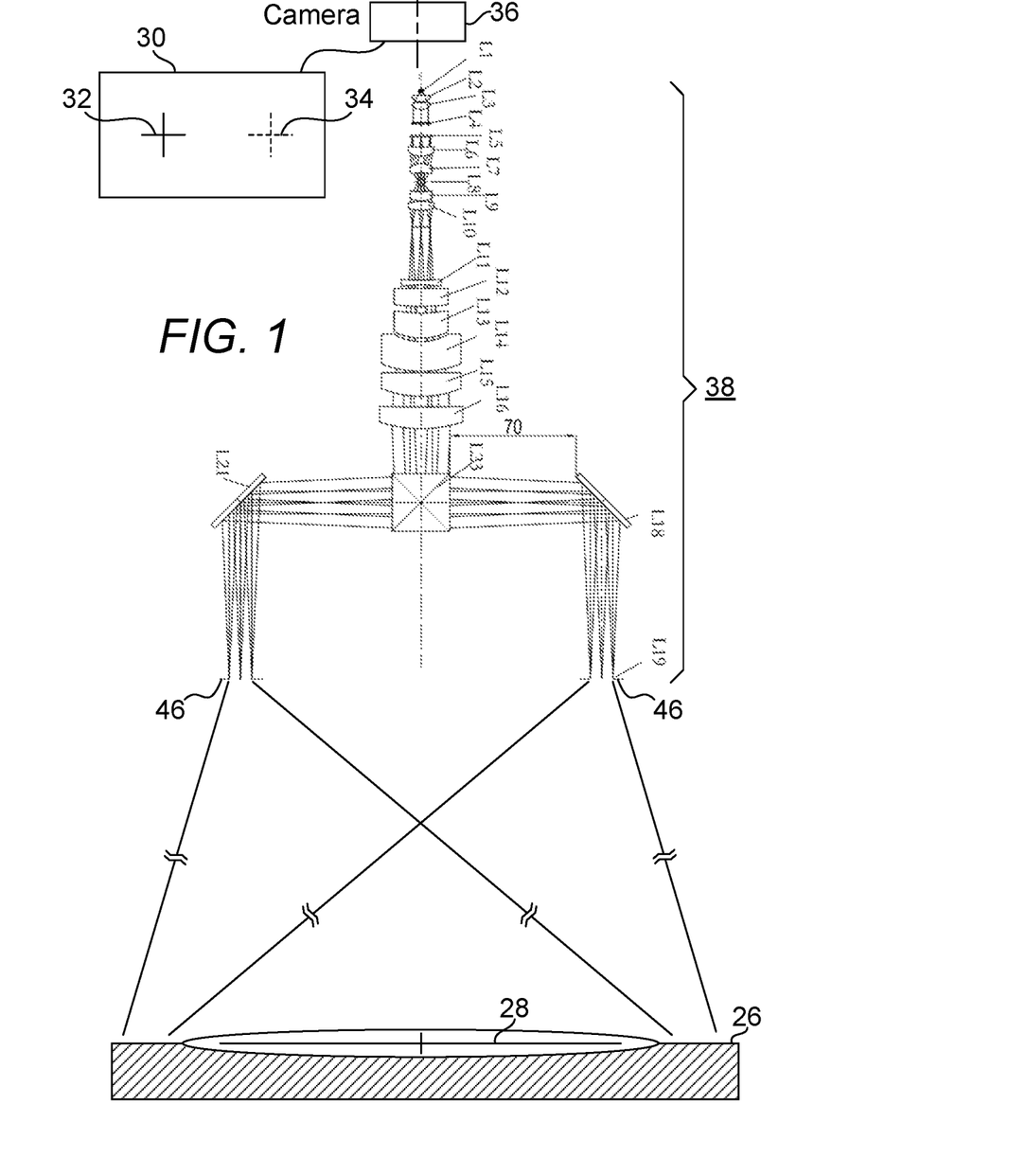
FIG. 1 is a diagram depicting one embodiment of a system for providing collimated light beams to be supplied to two spaced-apart exit pupils of a pair of binoculars for calibration.

FIG. 1 is a diagram depicting one embodiment of a system for providing collimated light beams to be supplied to two spaced-apart exit pupils 46 of a pair of binoculars 38, e.g., a pair of augmented reality/virtual reality (AR/VR) binoculars or a binocular telescope, for calibration. In calibrating the pair of binoculars 38, a large collimator 26 may be used to dispose the light beams entering the pair of binoculars through the exit pupils 46 in parallel configuration with the light paths of the binoculars 38. In this system, in order for the exit pupils 46 to allow images to traverse the light paths of the binoculars 38 and be cast at a camera 36 disposed at the entrance pupil end of the binoculars 38, the reticle 28 must be visible by the camera 36. A large interpupillary distance (IPD) necessarily requires the collimator 26 and the reticle 28 to be disposed at a large distance from the exit pupils 46 of the binoculars 38, making the entire setup of the collimator 26 large, costly and impractical due to weight and space limitations of the setup. In addition, if there are binoculars 38 of significantly different IPDs to be calibrated, multiple sets of collimators 26 and reticles 28 may be required, further adding to the costs and setup time. Display 30 of camera 36 shows images 32, 34 cast on and received by the camera 36. As shown, in order to calibrate the light paths of the binoculars 38, adjustments to the light paths must be made until the two cast images 32, 34 of the reticle 28 overlap one another. It is imperative that a calibration setup that is less costly, having more compact form factor and higher calibration throughputs be made available to enhance the optical calibration process of a pair of binoculars. FIGS. 2-8 depict various aspects of a present active self-monitoring calibration system for a pair of binoculars capable for use in calibrating binoculars having a large range of IPDs without requiring changeouts of any calibration setups.

Figure 2:
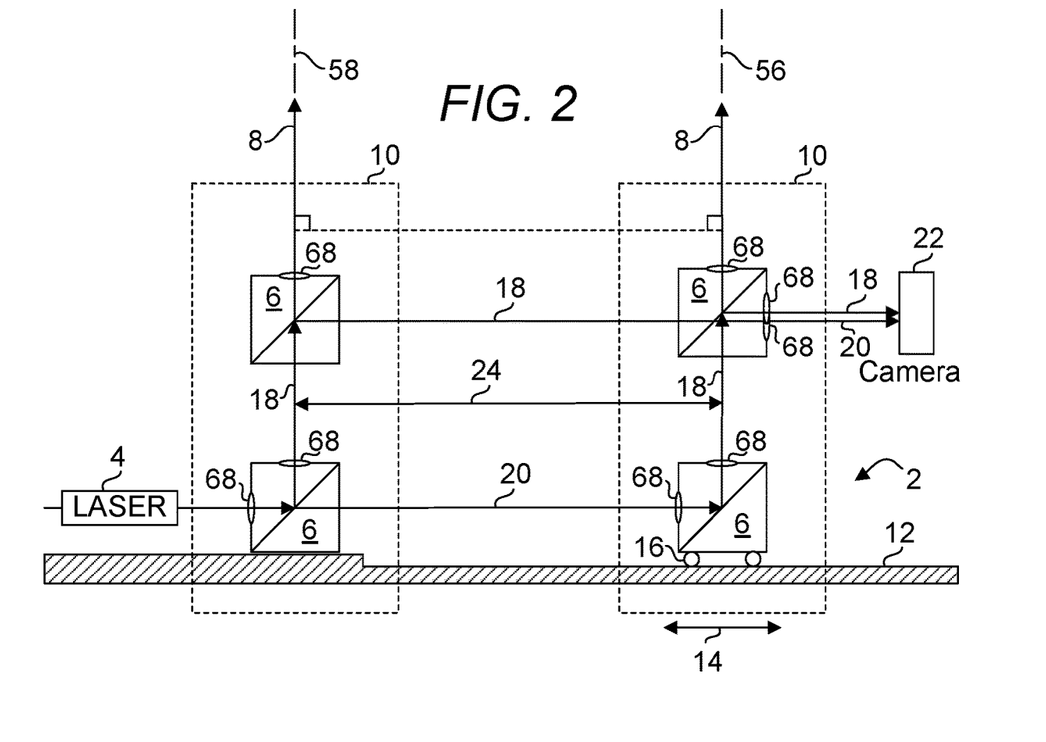
FIG. 2 is a diagram depicting one embodiment of a present system for providing highly-precise two spaced-apart parallel light beams, wherein the space between the two spaced-apart parallel light beams is configured to be actively adjustable.
Figure 3:
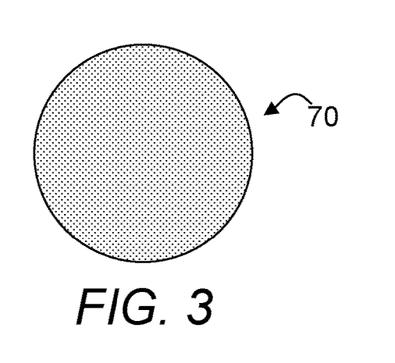
FIG. 3 is an example of a cast image received at a camera of the present system.

FIG. 2 is a diagram depicting one embodiment of a present system 2 for providing highly-precise two spaced-apart parallel light beams 8, wherein the space or distance 24 between the two spaced-apart parallel light beams 8 is configured to be actively adjustable such that no manual interventions are required. The system includes a first beam splitter 6 or the beam splitter disposed on the bottom left of the setup. The beam splitter 6 is configured for reflecting a light beam from a light source 4 at a right angle to create a first light beam 8, 18 along a central axis 58. A second beam splitter 6 or the beam splitter disposed on the lower right of the setup is configured for reflecting a transmitted light beam 20 from the light beam from the light source 4 to create a second light beam 8, 18 along a central axis 56 of the structure 10 on the right. It shall be noted that with the first or bottom row of beam splitters 6, two light beams 8 disposed at a right angle to the incoming light beam of the light source 4 are produced if the beam splitters 6 are each disposed in a manner to reflect the light beams 8 such that they are perpendicular to the incoming light beam from the light source 4. The second central axis 56 represents the axis along which the second beam splitter 6 and the fourth beam splitter 6 are disposed. The right structure 10 is configured to be movable with respect to the first light beam 6 and the third light beam 6 which themselves may be attached to another separately available structure 10. For simplicity, the structure 10 upon which the first light beam 6 and the third light beam 6 are fixedly attached to a base 12. This left structure 10, hence the pair of beam splitters 6 on the left, serve as a datum for which the parallelity of the second light beam 8 with respect to the first light beam 8 is based. A third beam splitter 6 or the upper left beam splitter is configured for transmitting the first light beam or the left light beam and reflecting the first light beam to create a third light beam 18, 20. It shall be noted that the first beam splitter 6 and the third beam splitter 6 are disposed along a first central axis 58. The first beam splitter 6 and the third beam splitter are preferably rigidly fixed with respect to its structure 10 and the base 12 to which it is attached to avoid any variability in the positions of the first beam splitter 6 and the third beam splitter 6 on the left structure 10 with respect to the base 12. A fourth beam splitter configured for transmitting the second light beam and reflecting the second light beam to create a fourth light beam, wherein the third light beam and the fourth light beam together form a first image. If, the pair of light beams are substantially parallel, i.e., with a deviation of under about several arc seconds, the first image received at camera 22 would appear uniform as shown in FIG. 3 as insufficient interferences occur between the light beams 18, 20 forming the first image as the two light beams are sufficiently coincidental. The first light beam 8 is said to be parallel to the second light beam 8. A perpendicular distance 24 between the second central axis 56 of the structure 10 and the first central axis 58 is adjustable to match two exit pupils of a pair of binoculars that is being calibrated. Therefore, in order to cast parallel light beams 8 through the light paths of the pair of binoculars 38, the perpendicular distance between the light paths must match the interpupillary distance (IPD) of the pair of binoculars 38. Referring back to FIG. 2, the fourth beam splitter 6 is shown with a vertical offset such that the reflected light beam 18 can be shown to be a different light beam from the transmitted light beam 20, both received at an image plane of a camera 22. In one embodiment, in order to cause movement 14 of the right structure 10, a translation mechanism 16 is coupled to the base 12. The translation mechanism 16 can be manually or automatically controlled to a position to provide an external light beam 8 configured to enter a light path of the pair of binoculars through an intended exit pupil. In one embodiment, the distance 24 is about 60-220 mm. It shall be noted that, in order to service a distance at mid to upper portion of this range, the collimator shown in FIG. 1 would have been required to be extended a distance of about several meters from the exit pupils, a distance impractical for most calibration applications. In some embodiments, suitable lenses 68 are provided to aid in focusing cast images on a suitable image plane, e.g., an image plane of a camera.

Figure 4:
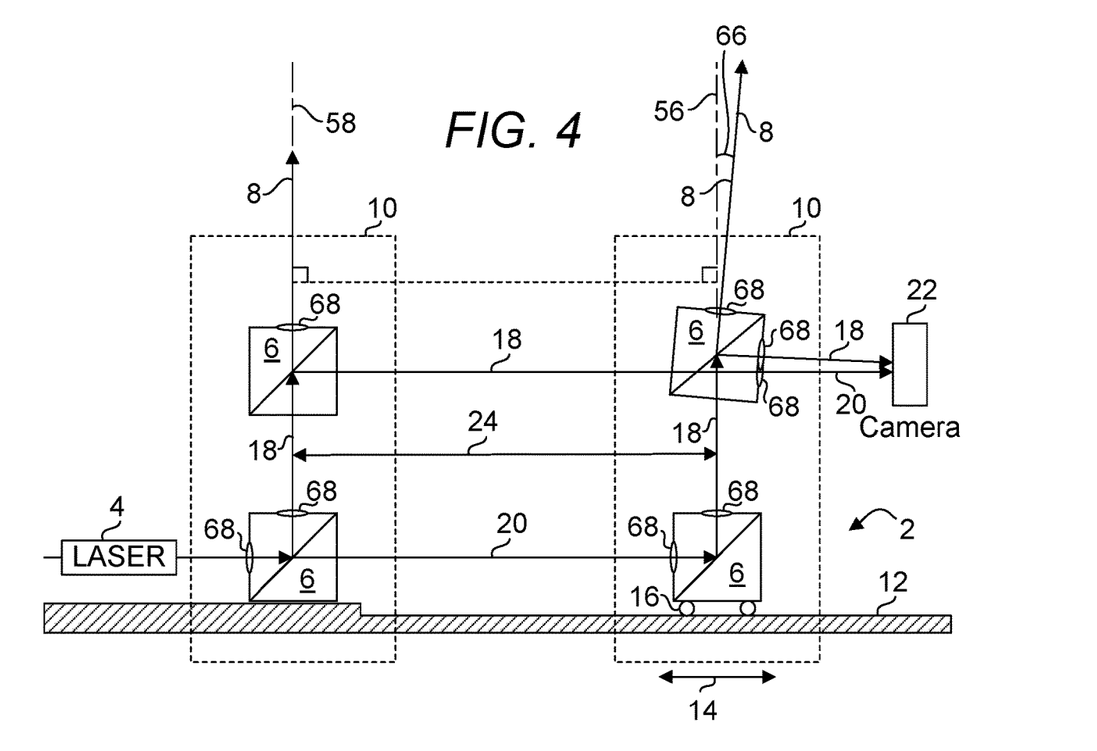
FIG. 4 is a diagram depicting one embodiment of a present system for providing highly-precise two spaced-apart light beams, wherein one of the light beams deviated from its parallel relationship with the datum.
Figure 5:
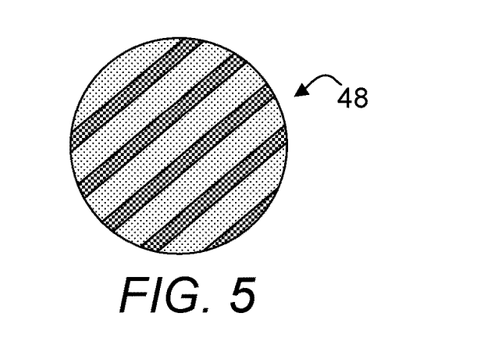
FIG. 5 is an example of a cast image received at a camera of the present system.

FIG. 4 is a diagram depicting one embodiment of a present system for providing highly-precise two spaced-apart light beams, wherein one of the light beams deviated from its parallel relationship with the datum, i.e., the left light beam 8. Here, the right beam splitter 6 is shown to have deviated from its factory mounting arrangement due, e.g., to shocks experienced by the system during transportation, etc. It shall be noted that a deviation 66 in the order of about several arc seconds with respect to the second central axis 56 has developed in the fourth beam splitter 6 and the light beam 18 reflected by the fourth beam splitter 6 is no longer parallel to the light beam reflected by the third beam splitter 6. The resulting image, as seen at camera 22, is a fringe pattern 48 as shown in FIG. 5. The fringe pattern 48 represents optical interferences that result due to the differences in the optical paths of the light beams 18, 20. The two light beams 18, 20 can therefore be said to be non-coincidental and the orientation of the fourth beam splitter 6 therefore requires adjustments to result in the first and second light beams 8 that are parallel. A deviation may also occur due to a deviation of the right structure 10 with respect to the base 12 even when the second beam splitter 6 and the fourth beam splitter 6 have been precisely and rigidly mounted, i.e., without relative movement of the beam splitters 6 with respect to the right structure 10. In one embodiment, the deviation is corrected manually. In one embodiment, the deviation is corrected automatically using a setup disclosed elsewhere herein.

Figure 6:
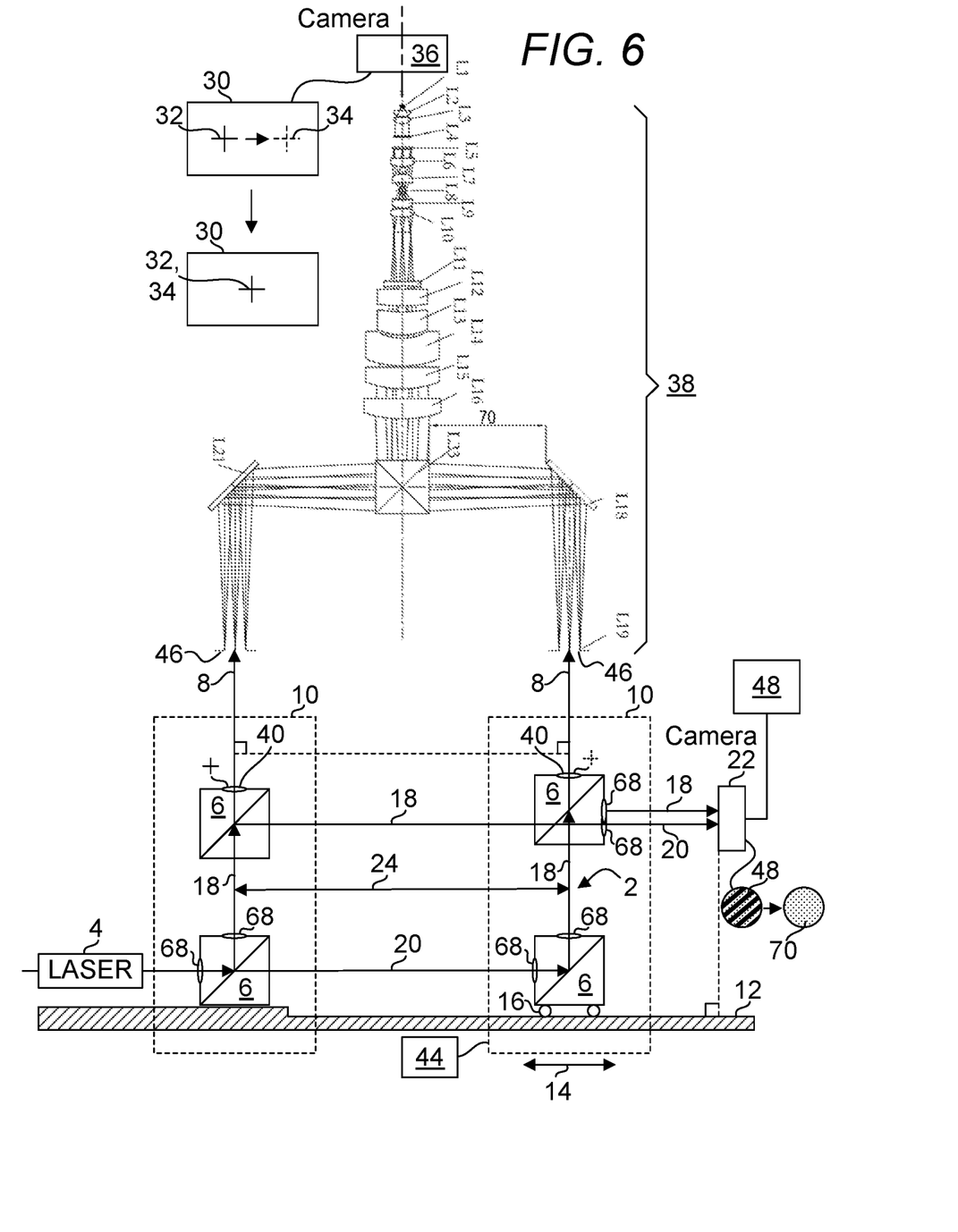
FIG. 6 is a diagram depicting one embodiment of a present system for providing highly-precise two spaced-apart parallel light beams used in calibrating the light paths of a pair of binoculars.
Figure 7:
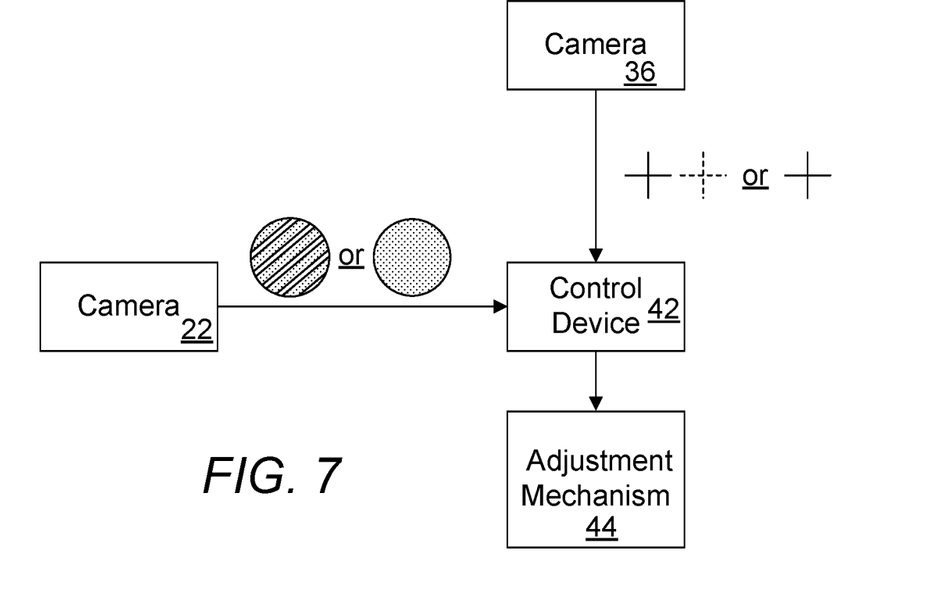
FIG. 7 is a diagram depicting a present control device configured to receive inputs from cameras and output control signals to an adjustment mechanism based on the inputs from one or more cameras.

FIG. 6 is a diagram depicting one embodiment of a present system for providing highly-precise two spaced-apart parallel light beams 8 used in calibrating the light paths of a pair of binoculars 38. FIG. 7 is a diagram depicting a present control device 42 configured to receive and process inputs from cameras 22, 36 and output control signals to an adjustment mechanism 44 based on the inputs from one or more cameras. The light beams 8 of the system shall be made parallel first before calibration of the binoculars 38 can be attempted as these parallel light beams are used as a datum to which the light paths of the binoculars 38 are calibrated. In one embodiment, the parallelity of the two light beams 8 is continuously self-monitored such that a deviation from parallelity that develops during use, is automatically detected and communicated to a stakeholder of the system by the control device 42. Self-monitoring can be carried out, on a pre-determined schedule, by performing image analyses and/or feature extractions on the images received by camera 22 to ascertain whether a deviation has occurred by detecting the presence of a fringe pattern due to interferences of the light beams 8. If a manual correction of the deviation is desired, the detection of a deviation can simply be communicated to the stakeholder. If an automatic correction of the deviation is desired, the detection of the deviation can result in the deviation being reported to the stakeholder and the deviation being corrected automatically before the stakeholder is informed of the completion of the deviation correction. In other words, the system can be actively self-monitored without ad-hoc or manual triggers to initiate a self-monitoring activity.

Upon ensuring that the system can produce two parallel light beams 8, the light paths of the binoculars 38 can then be calibrated. In use, a pair of binoculars allows light to enter at the entrance pupil end before splitting the image received at the entrance pupil end into two light paths exiting the exit pupils. By the same token, in calibrating the light paths of the pair of binoculars, the two parallelly disposed light beams supplied at the exit pupils shall result in a unified image that is an aggregate of the two parallelly disposed light beams. Therefore, in calibrating the binoculars, the light paths of the binoculars are adjusted such that a resulting image at the entrance pupil end is a unified image of the two parallelly disposed light beams. The present system includes a second camera 36 configured for receiving a second image resulting from directing the first light beam 8 and the second light beam 8 through exit pupils 46 of a pair of binoculars 38 to an entrance pupil of the pair of binoculars 38 and a control device 42 to which the second camera 36 is functionally connected and if the second image is determined to be of non-coincidental cast images 32, 34 through the exit pupils 46 of the pair of binoculars 38 by the first light beam 8 and the second light beam 8, a light path through a first of the exit pupils 46 of the pair of binoculars 38 is determined to be not parallel to a light path through a second of the exit pupils 46 of the pair of binoculars 38. If the second and fourth beam splitters 6 are rigidly attached to the right structure 10, a correction is made to the right structure 10 itself by way of a rotation and/or a translation. In this embodiment, reticles 40 that are disposed at second and fourth beam splitters 6 are useful for making the cast images at the image plane 30 more easily discernible.

Figure 8:
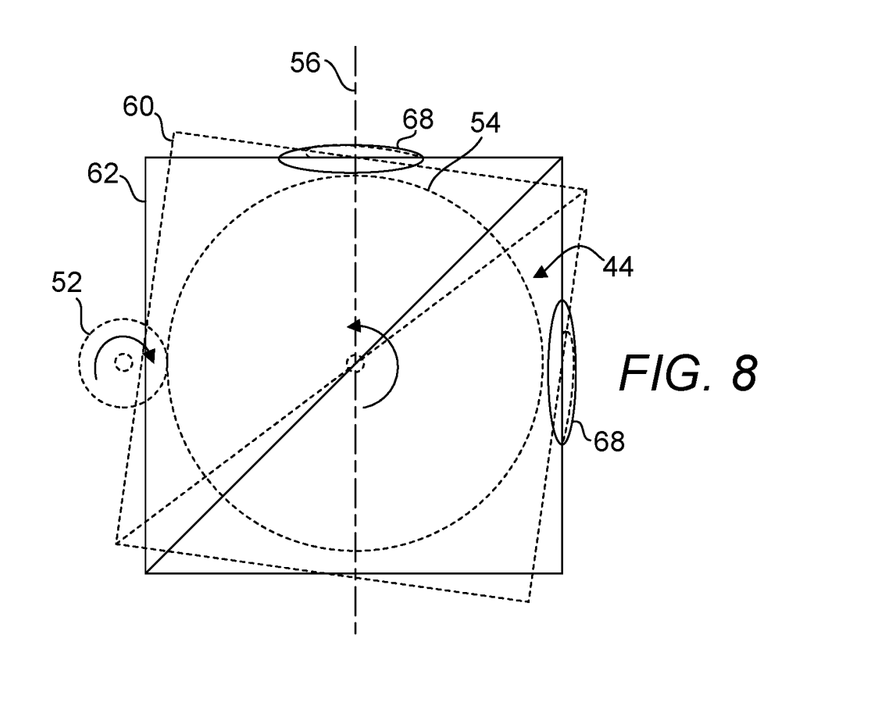
FIG. 8 is a diagram depicting a manner in which the orientation of a beam splitter is corrected.

FIG. 8 is a diagram depicting a manner in which the orientation of a beam splitter is corrected. Although a rotation mechanism 50 using a plurality of gears 52, 54 is shown, other types of positional or orientational/rotational correction mechanisms may be used. Shown herein is a beam splitter 6 disposed in an orientation 60 prior to its orientation correction due to a deviation in the orientation of the beam splitter 6. Upon correction, the beam splitter is shown disposed in orientation 62. Here, a drive gear 52 is used to correct the orientation of the beam splitter by driving the driven gear 54 attached to the beam splitter 6 such that a rotation of the drive gear 52 results in a rotation of the beam splitter 6 and the driven gear 54 in unison. In one embodiment, the cast images 32, 34 are cast images of reticles to ensure that completion of a calibration process can be easily discerned. The pair of binoculars can be said to have been calibrated when the cast images 32, 34 overlap one another. Again, calibration of the light paths of the binoculars may be accomplished manually or automatically. In a manual process, the light paths of the binoculars are adjusted manually until the cast images 32, 34 of reticles are observed to overlap one another. In an automated process, the light paths of the binoculars may be adjusted using tools configured for such adjustments. A requirement for calibration of the light paths of the binoculars originates from the determination that the cast images 32, 34 of reticles do not overlap by way of feature detection in an image analysis. The light paths of the binoculars are adjusted and another determination of whether the cast images 32, 34 of reticles approach one another is made. If they do, continue the adjustments until the cast images 32, 34 of reticles overlap. If they depart from one another, reverse the adjustments until the cast images 32, 34 of reticles overlap.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for providing two spaced-apart parallel light beams wherein the space between the two spaced-apart parallel light beams is adjustable, said system comprising:
    (a) a first beam splitter configured for reflecting a light beam from a light source to create a first light beam;
    (b) a second beam splitter configured for reflecting a transmitted light beam from the light beam from the light source to create a second light beam;
    (c) a third beam splitter configured for transmitting said first light beam and reflecting said first light beam to create a third light beam, said first beam splitter and said third beam splitter are disposed along a first central axis;
    (d) a fourth beam splitter configured for transmitting said second light beam and reflecting said second light beam to create a fourth light beam, wherein said third light beam and said fourth light beam together form a first image; and
    (e) a structure comprising a second central axis, each of said second beam splitter and said fourth beam splitter is disposed on said structure along said second central axis of said structure, said structure is configured to be movable with respect to said first light beam and said third light beam such that a perpendicular distance between said second central axis of said structure and said first central axis is adjustable;
wherein if said first image is determined to be an image including a fringe pattern, a request for correcting at least one of a rotation and a translation of at least one of said second beam splitter and said fourth beam splitter is indicated.

2. The system of claim 1, wherein said distance is about 60-220 mm.

3. The system of claim 1, further comprising a first camera configured for receiving said first image and a control device to which said first camera is functionally connected and said determination is made using said controller.

4. The system of claim 1, wherein if said first image is determined to be a uniform pattern, said first light beam is determined to be parallel to said second light beam.

5. The system of claim 1, further comprising a second camera configured for receiving a second image resulting from directing said first light beam and said second light beam through exit pupils of a pair of binoculars to an entrance pupil of the pair of binoculars and a control device to which said second camera is functionally connected and if said second image is determined to be of non-coincidental cast images through the exit pupils of the pair of binoculars by said first light beam and said second light beam, a light path through a first of the exit pupils of the pair of binoculars is determined to be not parallel to a light path through a second of the exit pupils of the pair of binoculars.

6. The system of claim 5, wherein said cast images are cast images of reticles.

7. The system of claim 1, wherein said rotation correction is performed with a rotation mechanism.

8. The system of claim 1, wherein said translation correction is performed with a translation mechanism.

* * * * *